(12) United States Patent
Vaikar

(10) Patent No.: US 11,334,394 B2
(45) Date of Patent: *May 17, 2022

(54) FUNCTION AS A SERVICE (FAAS) EXECUTION DISTRIBUTOR

(71) Applicant: VMware, Inc., Palo Alto, CA (US)

(72) Inventor: Amol Manohar Vaikar, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,139

(22) Filed: Aug. 4, 2020

(65) Prior Publication Data
US 2020/0379817 A1 Dec. 3, 2020

Related U.S. Application Data

(63) Continuation of application No. 16/214,163, filed on Dec. 10, 2018, now Pat. No. 10,747,580.

(51) Int. Cl.
*G06F 9/50* (2006.01)
*H04L 67/1021* (2022.01)
*H04L 67/563* (2022.01)
*H04L 67/60* (2022.01)

(52) U.S. Cl.
CPC .......... *G06F 9/5072* (2013.01); *G06F 9/5077* (2013.01); *H04L 67/1021* (2013.01); *H04L 67/2814* (2013.01); *H04L 67/32* (2013.01)

(58) Field of Classification Search
CPC . G06F 9/5072; G06F 9/5077; H04L 67/1021; H04L 67/2814; H04L 67/32
See application file for complete search history.

(56) References Cited

U.S. PATENT DOCUMENTS

| | | | | |
|---|---|---|---|---|
| 7,023,979 | B1* | 4/2006 | Wu | H04M 3/5233 379/265.11 |
| 8,429,630 | B2* | 4/2013 | Nickolov | H04L 69/32 717/148 |
| 9,794,352 | B2 | 10/2017 | Qiang | |
| 2009/0276771 | A1* | 11/2009 | Nickolov | H04L 67/1014 717/177 |
| 2013/0268357 | A1 | 10/2013 | Heath | |

(Continued)

OTHER PUBLICATIONS

Disclosed Anonymously, Method to call cached functions effectively in serverless computing paradigm to reduce FaaS latency, IP.COM Journal, IP.COM Inc., Jun. 29, 2018, West Henrietta, NY, US.

(Continued)

*Primary Examiner* — Sm A Rahman
(74) *Attorney, Agent, or Firm* — Patterson + Sheridan, LLP

(57) ABSTRACT

The disclosure provides an approach for distribution of functions among data centers of a cloud system that provides function-as-a-service (FaaS). For example, the disclosure provides one or more function distributors configured to receive a request for loading or executing a function, automatically determine an appropriate data center to load or execute the function, and automatically load or execute the function on the determined data center. In certain embodiments, the function distributors are further configured to determine an appropriate data center to provide storage resources for the function and configure the function to utilize the storage resources of the determined data center.

20 Claims, 4 Drawing Sheets

(56) References Cited

U.S. PATENT DOCUMENTS

2019/0028552 A1    1/2019   Johnson, II et al.
2019/0042594 A1    2/2019   Trika et al.
2019/0179678 A1    6/2019   Banerjee et al.

OTHER PUBLICATIONS

Sewak, Mohit et al., Winning in the era of Serverless Computing and Function as a Service, 2018 3rd International Conference for Convergence in Technology (I2CT), The Gateway Hotel, XION Complex, Apr. 6, 2018, pp. 1-5, Pune, India.

* cited by examiner

FUNCTION AS A SERVICE (FAAS) EXECUTION DISTRIBUTOR

CROSS-REFERENCE TO RELATED APPLICATIONS

This application is a continuation of U.S. patent application Ser. No. 16/214,163, filed Dec. 10, 2018, which claims priority to India Provisional Patent Application No. 201841030859, filed Aug. 17, 2018. The entire contents of each of these applications are hereby incorporated by reference in their entirety.

BACKGROUND

Cloud architectures are used in cloud computing and cloud storage systems (referred to as cloud systems) for offering function-as-a-service (FaaS) cloud services. Such cloud systems can refer to any type of cloud system such as a private cloud system, public cloud system, or hybrid cloud system. A FaaS cloud service is a type of cloud service that provides a platform to develop, run, and manage application functions on the infrastructure provided by a cloud system. For example, the cloud system can provide computing resources (e.g., servers, hosts, virtual computing instances (VCIs) such as virtual machines (VMs) running on hosts, etc.) as well as storage resources (e.g., networked storage, storage coupled to physical devices, a virtual storage area network, etc.) for executing the functions. Storage resources in a cloud system may include a cloud-based object store or database.

An application function, or function as referred to herein, refers to a piece of code that can be executed using resources of the cloud system. For example, a function may be code that takes an input and provides an output. The execution of the function on the resources of the cloud system allows the function to be developed and launched without the complexity of managing the resources needed to support the execution of the function. Instead, the cloud system provides and maintains such resources, including compute resources and storage resources for executing the function.

Beneficially, FaaS cloud services provided by a cloud system allow developers to scale the execution of application functions more easily than with traditional computing models. For example, typically a monolithic application may include code for executing several functions. In order to scale the use of the monolithic application, many instances of the monolithic application may need to be executed and physical architecture such as servers provided to support such execution. However, using FaaS cloud services, a developer can split the monolithic application into a number of functions. Such functions can be executed independently of one another. Further, execution of each of these functions can be scaled automatically and independently in the cloud system. For example, more of the resources of the cloud system can be provided to execute functions as needed.

Cloud systems can include multiple data centers. A data center includes a plurality of physical computing devices (e.g., servers, hosts, hosts running VCIs, etc.) that are interconnected utilizing physical networking equipment (e.g., physical routers, physical switches, etc.) over a local network. A data center may further include storage (e.g., coupled to one or more of the physical computing devices). The multiple data centers may further be interconnected via a network (e.g., the Internet). Typically, data centers of a cloud system are located in different physical regions. For example, a cloud system may have data centers located in different countries or in different regions of a country (e.g., East United States, West United States, etc.). Some data centers can provide both compute resources and storage resources to users of the cloud system. Some data centers can provide only compute resources to users of the cloud system. Some data centers can provide only storage resources to users of the cloud system.

A developer can load/deploy a function into a cloud system. For example, the cloud system can provide application programming interfaces (APIs) that a developer accesses (e.g., using a web browser running on a computing device) to load functions into the cloud system, such as over a network. The function may be loaded into a data center specified by the developer. In particular, the developer may have to manually choose which data center of the cloud system to load the function into. Further, within the data center, the function may be loaded onto one or more of the compute resources in the data center. Accordingly, the function is executable by one or more compute resources of the data center.

The function can be called/triggered to execute based on a variety of different triggers. For example, the function can be triggered by an application running on a client device (e.g., a computing device such as a mobile device, workstation, server, etc.), another function running in the same data center of the cloud system, a different data center of the cloud system, or another cloud system, another service operating in the cloud system, an event occurring in the cloud system (e.g., a timer expiring, a file being uploaded to storage of the cloud system, etc.), etc.

In one example, the data center into which the function is loaded includes an API gateway that can trigger execution of the function. The API gateway corresponds to one or more computing resources of the data center accessible over a network, such as the Internet. The API gateway may be associated with a uniform resource locator (URL). An application running on a client device can establish an HTTP session (e.g., using an underlying transport layer such as TCP) with the API gateway over the network based on the URL of the API gateway. The application can then exchange HTTP requests and HTTP responses with the API gateway to trigger execution of the function. Though certain aspects are described with respect to establishing an HTTP session and utilizing HTTP requests and HTTP responses, it should be noted that similarly an HTTPS session can be established and HTTPS requests and HTTPS responses utilized. For example, an HTTP request to execute the function can be generated by the application and sent to the API gateway over the established HTTP session. The HTTP request includes information indicative of a request to execute the function. The HTTP request can further include input parameters (e.g., variables, strings, etc.) to be passed to the function as input for execution.

The API gateway receives the HTTP request, and then further selects a computing resource of the data center that includes a copy of the function to handle the request (e.g., based on a load balancing function). Accordingly, the computing resource receives the request and executes the function based on the request from the client. The executed function may return information to the application (e.g., in a HTTP response sent over the internet to the application), read/write data in storage, trigger execution of another function, etc.

Each data center of a cloud system has its own API gateway associated with its own URL. Accordingly, for an application to establish an HTTP session and generate an HTTP request to execute a function, the application is hardcoded with the URL of the desired API gateway to handle the request, and accordingly, hardcoded with the data center used to execute the function.

Similarly, in another example, a function running in the cloud system can trigger another function. For example, the cloud system can provide in its APIs for developing a function, the ability to call another function. For a function to call another function, it has to specify which data center the other function is located in, and accordingly, is hardcoded with the data center used to execute the other function. For example, the function may call another function by establishing an HTTP session with and sending an HTTP request to the API gateway of the data center including the function as discussed.

Further, if a function utilizes persistent storage, such as storage resources of the cloud system, the function is hardcoded with the location of the storage, such as an identifier of the data center in which the storage is located.

In order to reduce network latency between code (e.g., a function, application, etc.) triggering execution of a function and the function itself, the code can be hardcoded to execute the function in a data center that is geographically close to the computing device executing the code. Further, to reduce network latency between the function and storage utilized by the function, the function itself can be hardcoded to utilize storage in a data center that is geographically close to the data center executing the function. In particular, the less geographical distance between computing devices, typically the lower the latency of network communication between the devices. For example, if a developer knows that the code that triggers execution of a function is going to run on a computing device located in the western part of the United States, the developer can load the function onto a data center in the western part of the United States. Further, the developer hardcodes in the code a trigger for the function that triggers execution of the function on the data center in the western part of the United States. If the function itself uses persistent storage, the developer can hardcode the function to utilize storage resources of the same data center that executes the function if it has available storage resources, or another data center with storage resources that is geographically close to the data center that executes the function.

However, hardcoding of the data centers for executing functions in code or hardcoding of the data centers providing storage for functions as discussed can reduce flexibility for changing conditions. For example, a computing device executing code that triggers execution of a function can move locations. Further, a cloud system can add new data centers. Accordingly, the closest data center geographically to the code or function may no longer be the same one that is hardcoded. This can negatively impact network latency between the computing device executing the code and the computing device executing the function, or between a computing device executing the function and the storage.

SUMMARY

A method described herein provides for executing a function in a data center of a cloud computing system comprising a plurality of data centers, each of the plurality of data centers comprising one or more compute resources. The method includes receiving, at a function distributor from an application, a request to execute the function, the request comprising an identifier of the function. The method further includes selecting, by the function distributor, a first data center of the plurality of data centers to execute the function. The method further includes causing, by the function distributor, the first data center to execute the function.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for distribution of functions among data centers of a cloud system that provides FaaS. For example, the disclosure provides one or more function distributors configured to receive a request for loading or executing a function, automatically determine an appropriate data center to load or execute the function, and automatically load or execute the function on the determined data center. In certain embodiments, the function distributors are further configured to determine an appropriate data center to provide storage resources for the function and configure the function to utilize the storage resources of the determined data center.

The disclosure provides a number of advantages over the prior art. In particular, the function distributors allow for dynamic selection of a data center to load and execute a function and/or provide storage resources to a function. Accordingly, the selection of a data center does not need to be hardcoded into the code calling the function or in a function utilizing storage resources. Therefore, if a location of a device executing the code changes, or a new data center is added to a cloud system, the function distributor can automatically select a different data center for the code/function that provides reduced network latency, such as a data center close to the executing code/function. Thus, the disclosure provides a technical solution through function distributors to the technical problem of network latency issues in cloud systems providing FaaS.

Figure 1:
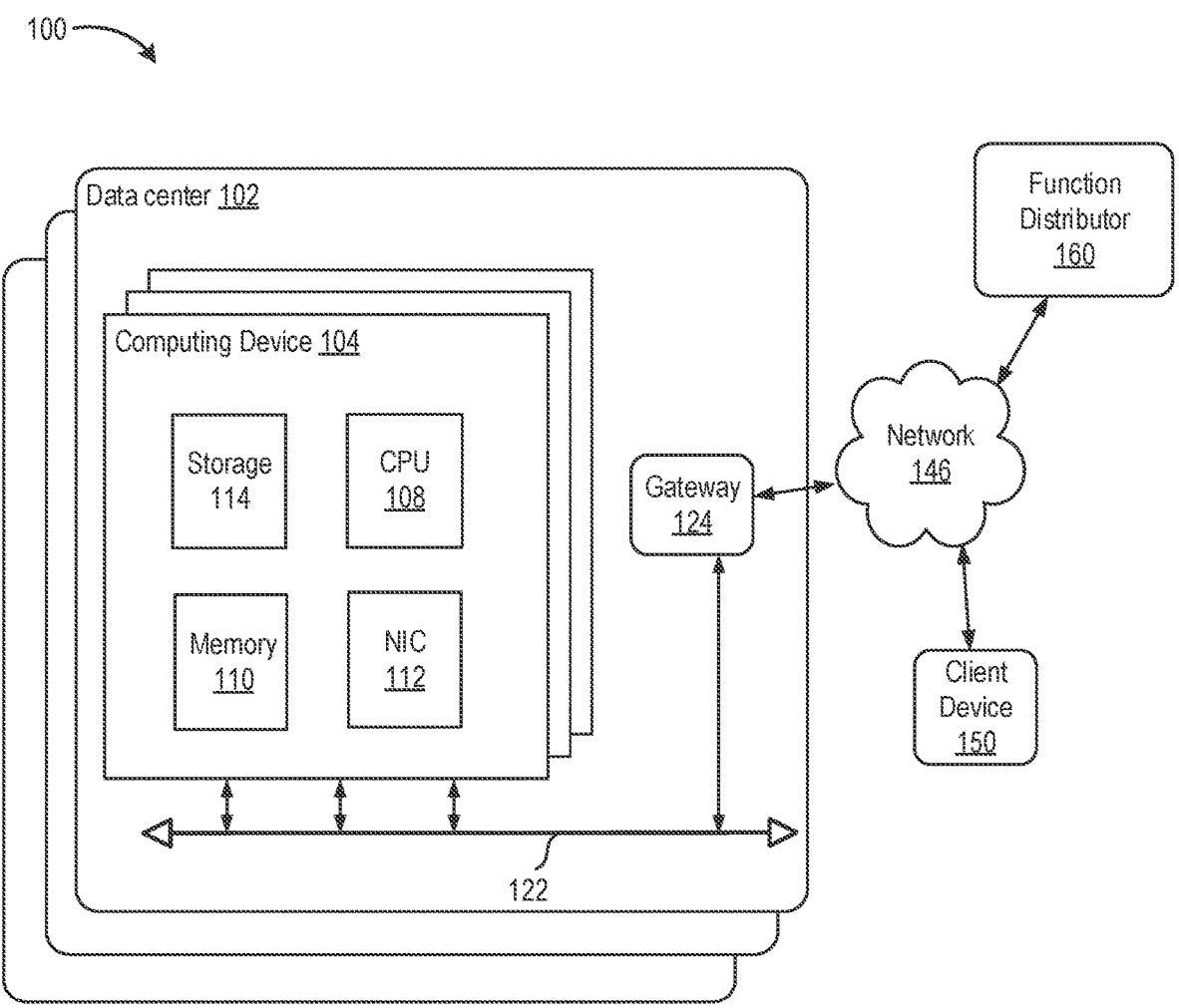
FIG. 1 depicts a block diagram of a cloud system in which one or more embodiments of the present disclosure may be utilized.

FIG. 1 depicts a block diagram of a cloud system 100 in which one or more embodiments of the present disclosure may be utilized. Cloud system 100 includes a plurality of data centers 102. In certain embodiments, each of the data centers 102 is associated with a different region (e.g., West United States, East United States, East India, West India, etc.). Certain aspects of the plurality of data centers 102 are discussed with respect to a singular data center 102, but are applicable to each of the plurality of data centers 102.

Cloud system 100 may be a private cloud system, a public cloud system, or a hybrid cloud system. A private cloud system includes one or more data centers controlled and administrated by a particular enterprise or business organization. A public cloud system includes one or more data centers operated by a cloud computing service provider and exposed as a service available to account holders, such as the particular enterprise in addition to other enterprises. A hybrid cloud system includes both types of data centers. Accordingly, as used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. A hybrid cloud is a cloud architecture in which a tenant is provided with seamless access to both private cloud resources and public cloud resources.

Data center 102 includes one or more physical computing devices ("computing devices 104"). A computing device 104 may include conventional components of a computing device, such as one or more processors (CPUs) 108, system memory 110, a network interface 112, storage system 114, and other I/O devices such as, for example, USB and VGA interfaces (not shown). CPU 108 is configured to execute instructions, for example, executable instructions, functions, or code that cause CPU 108 to perform one or more operations, such as described herein, and may be stored in memory 110 and in local storage. Memory 110 is a device allowing information, such as executable instructions, applications, functions, code, and other data, to be stored and retrieved. Memory 110 may include, for example, one or more random access memory (RAM) modules. Network interface 112 enables computing device 104 to communicate with another device via a communication medium, such as a network 122 within data center 102. Network interface 112 may comprise one or more network interface devices, also referred to as Network Interface Cards (NICs). Storage system 114 represents local storage devices (e.g., one or more hard disks, flash memory modules, solid state disks, and optical disks) and/or a storage interface that enables computing device 104 to communicate with one or more network data storage systems. Examples of a storage interface are a host bus adapter (HBA) that couples computing device 104 to one or more storage arrays (not shown) such as a storage area network (SAN), a distributed virtual SAN, or a network-attached storage (NAS), as well as other network data storage systems. Centralized storage arrays can also be accessed via network 122 using iSCSI drivers. Though not shown, a computing device 104 can include a virtualization layer (e.g., hypervisor) that abstracts processor, memory, storage, and networking resources computing device 104 into multiple VCIs (e.g., VMs, containers, etc.).

Computing devices 104 or VCIs running on the computing devices 104 can execute code or functions as discussed herein. Accordingly, computing devices 104 correspond to computing resources of data center 102 and cloud system 100.

Further, storage systems 114 present on computing devices 104 or other storage arrays (not shown) accessible on network 122 can store data for functions as discussed herein. Accordingly, storage systems 114 and other storage arrays correspond to storage resources of data center 102 and cloud system 100.

Data center 102 further includes a gateway 124. Gateway 124 provides computing devices 104 and VCIs running on computing devices 104 with connectivity to external network 146 (e.g., the Internet). Gateway 124 may manage external public IP addresses for computing devices 104 and route traffic incoming to and outgoing from data center 102 and provide networking services, such as firewalls, network address translation (NAT), dynamic host configuration protocol (DHCP), and load balancing. Gateway 124 may use network 122 to transmit network packets to computing devices 104. Gateway 124 may be a VCI, a physical device, a software module running within computing device 104, etc. Though shown as a single component, the functionality of gateway 124 may be distributed across multiple VCIs and/or physical devices. Gateway 124 corresponds to an API gateway, as discussed, and is associated with its own URL. In particular, each gateway 124 of each data center 102 is associated with its own URL. Each of the data centers 102 of cloud system 100, accordingly, is coupled to external network 146 via gateway 124, and associated with a different URL corresponding to the URL of its gateway 124.

Client device 150 is connected to external network 146 (e.g., directly via a NIC, via another gateway, etc.). Client device 150 corresponds to a device used by a user (e.g., developer) to access FaaS provided by cloud system 100. Client device 150 may be a device similar to computing device 104, a mobile device, a VCI, another computing device, software (e.g., a browser) running on a computing device, etc. Though only one client device 150 is shown, many client devices 150 can be connected to network 146 and access FaaS provided by cloud system 100. A client device 150 may be external to, or part of cloud system 100.

Function distributor 160 is also connected to external network 146. Function distributor 160 corresponds to a device configured to distribute functions among data centers 102 of cloud system 100 as further discussed herein. Function distributor 160 stores connection information (e.g., URLs) associated with each of data centers 102 so that it can establish connections with each of data centers 102. Further, function distributor 160 stores information indicative of a location of each of the data centers 102 so that it can distribute functions among data centers 102 based on location of the data centers 102. Function distributor 160 can be implemented as a VCI, a physical device, a software module running within a computing device 104, etc. Though shown as a single component, the functionality of function distributor 160 may be distributed across multiple VCIs and/or physical devices. Function distributor 160 can be external to, or part of cloud system 100. Function distributor 160 may be external to data centers 102 or part of one or more data centers 102. Like gateway 124, in certain embodiments, function distributor 160 is associated with its own URL. It should be noted that one function distributor 160 can be configured to work with one cloud system, or many different cloud systems of the same or different types.

Figure 2:
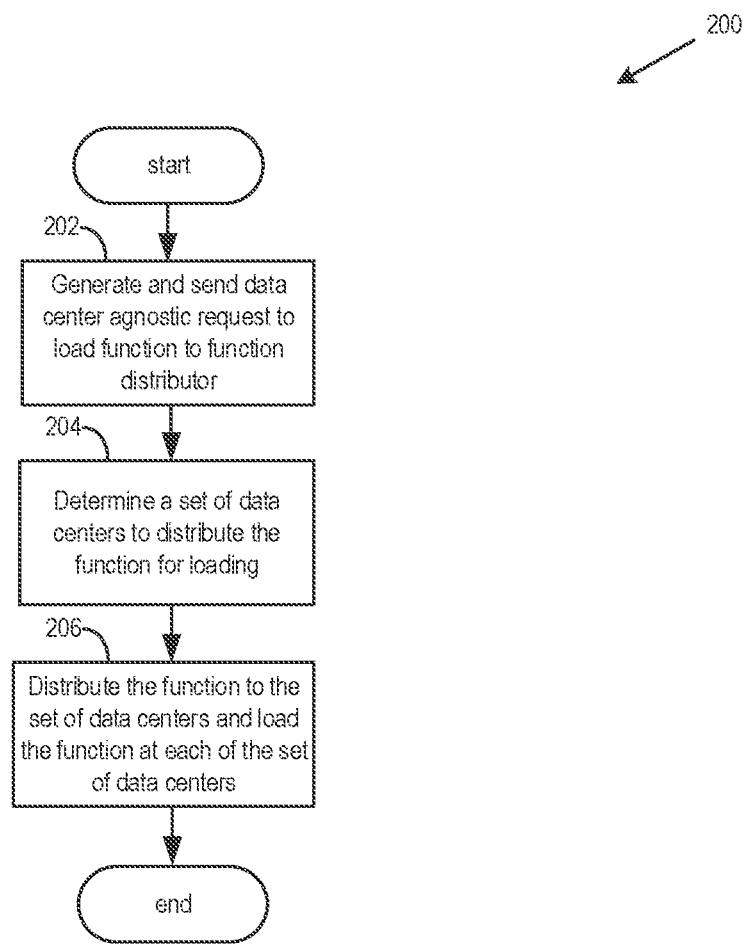
FIG. 2 depicts a flow diagram of a method of handling a request to load a function into a cloud system at a function distributor, accordingly to an embodiment.

FIG. 2 depicts a flow diagram of a method 200 of handling a request to load a function into a cloud system at a function distributor, accordingly to an embodiment. Method 200 is described with respect to cloud system 100 of FIG. 1.

At block 202, client device 150 generates and sends a data center agnostic request to load a function onto cloud system 100 to function distributor 160 over network 146. The request is data center agnostic in that it does not specify a data center 102 on which to load the function. In certain embodiments, the data center agnostic request is associated with a URL of the function distributor 160 and therefore is sent to the function distributor 160. In certain embodiments, the client device 150 establishes an HTTP session with the function distributor 160 based on the URL of the function distributor 160. The client device 150 then exchanges HTTP requests and HTTP responses with the function distributor 160 to send data corresponding to the function to function distributor 160 requesting the function be loaded onto cloud system 100.

At block 204, the function distributor 160 receives the data center agnostic request to load a function onto cloud system 100 and determines a set of data centers 102 to distribute the function. In one example, the function distributor 160 determines the set of data centers 102 to be all data centers 102 of cloud system 100 with compute resources to execute functions. In another example, the function distributor 160 determines the set of data centers 102 based on an indication in the data center agnostic request of the set of data centers 102. In yet another example, the function distributor 160 determines the set of data centers 102 to be less than all data centers 102 of cloud system 100.

In certain embodiments, the function distributor 160 further stores information associating an identifier of the function with the set of data centers 102, so that the function distributor 160 can determine on which set of data centers 102 the function is loaded.

At block 206, the function distributor 160 distributes the function to each of the set of data centers 102 over network 146 and the function is loaded on each of the data centers 102. In one example, function distributor 160 has root access to each of the data centers 102, meaning it has access to and connection information for platform management devices in each of the data centers 102 responsible for loading functions onto computing devices 104 of the data center 102. The function distributor 160 accordingly sends requests (e.g., using any appropriate communication protocol such as HTTP, TCP, etc.) to load the function to platform management devices of each of the data centers 102 over network 146. The platform management device in each data center then loads the function onto computing devices 104 of the data center 102.

In another example, function distributor 160 is configured to interact with datacenters 102 in the same manner as an end user would to load the function onto each of the data centers 102. For instance, for each data center 102, the function distributor 160 can interface with the APIs provided by the cloud system 100 over network 146 to load the function onto the data center.

Accordingly, the function distributor 160 automatically loads a function onto a plurality of data centers of a cloud system, instead of a user loading a function onto one specific data center specified by the user.

Figure 3:
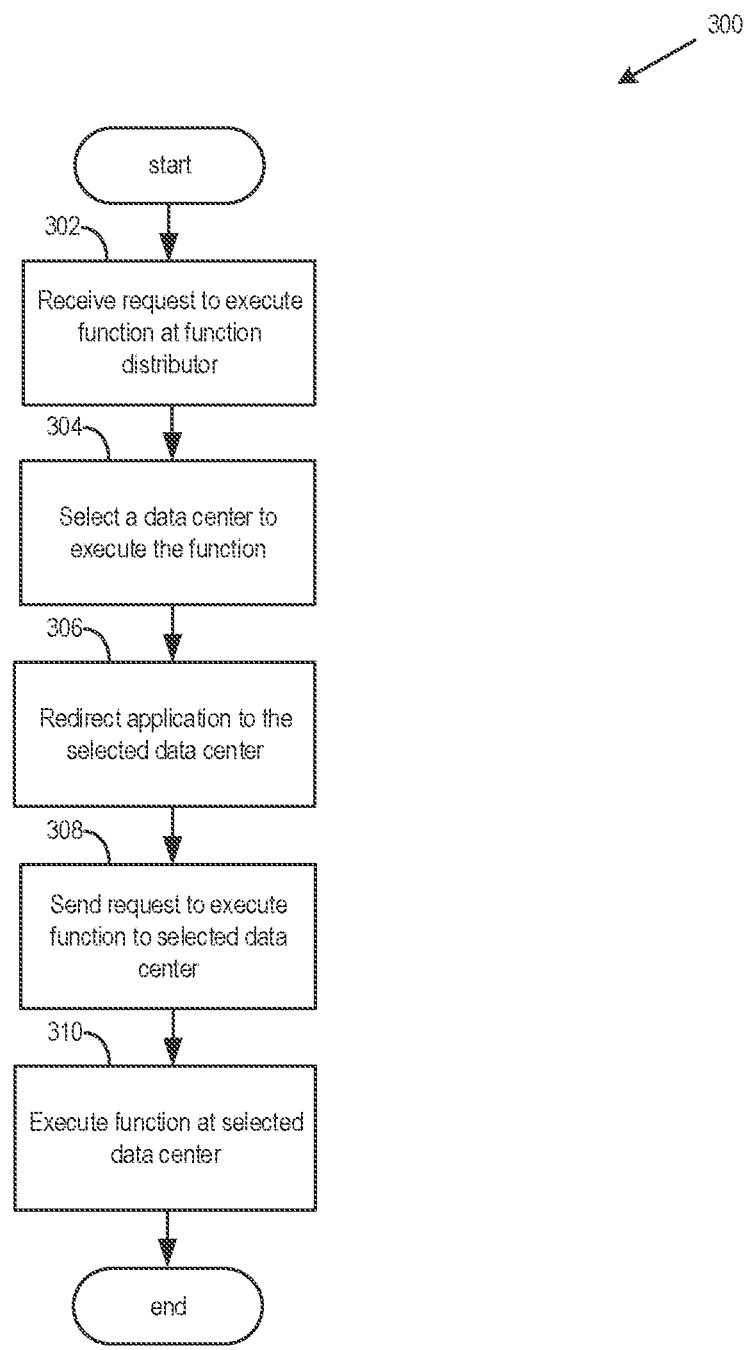
FIG. 3 depicts a flow diagram of a method of handling a request to execute a function loaded in a cloud system at a function distributor, accordingly to an embodiment.

FIG. 3 depicts a flow diagram of a method 300 of handling a request to execute a function loaded in a cloud system at a function distributor, accordingly to an embodiment. Method 300 is described with respect to cloud system 100 of FIG. 1.

At block 302, function distributor 160 receives a request to execute a function loaded on cloud system 100. For example, function distributor 160 receives the request from an application, which can refer to another function, an application executing on client device 150, etc. The function distributor 160 receives the request over network 146.

In one example, the application includes instructions that call for execution of the function. The instructions that call for execution of the function, instead of specifying a URL of a particular data center 102, include the URL of function distributor 160 and an identifier of the function. Accordingly, the application establishes an HTTP session with function distributor 160. The application further generates an HTTP request to execute the function and sends the HTTP request to the function distributor 160. The HTTP request may further include the identifier of the function (e.g., as part of the URL).

At block 304, the function distributor 160 selects a data center 102 in cloud system 100 to execute the function. For example, the function distributor 160 determines the set of data centers 102 that have the function loaded based on information stored at the function distributor 160 and the received identifier of the function. The function distributor 160 then selects one of the set of data centers 102 to execute the function.

In one example, the function distributor 160 selects the data center 102 of the set of data centers 102 that is geographically closest to the location where the application is running. The function distributor 160 accordingly determines a location where the application is running. In one example, the function distributor 160 determines the application location based on an address (e.g., IP address) included in the request to execute the function (e.g., HTTP request). In another example, the application explicitly includes geolocation information (e.g., GPS coordinates) associated with the application in the request to execute the function. The function distributor 160 can determine the application location based on the geolocation information.

As discussed, the function distributor 160 further stores information indicative of a location of each of the data centers 102. Based on the information indicative of a location of each of the data centers 102, and the application location, the function distributor 160 determines and selects the data center 102 of the set of data centers 102 that is geographically closest to the location where the application is running.

In certain embodiments, the function distributor 160 may choose to execute the function in a data center 102 that does not have the function loaded. For example, the function distributor 160 may determine that all the data centers 102 that have the function loaded are geographically distant from the location where the application is running, or that the data centers 102 having the function loaded are unavailable. Accordingly, the function distributor 160 may first load the function on one or more additional data centers 102, such as according to method 200, and then select one of the one or more additional data centers 102 to execute the function. Thus, in certain embodiments, the function distributor 160 can load functions into additional data centers 102 at different times.

At block 306, the function distributor 160 redirects the application to the selected data center 102. In particular, the function distributor 160 sends information over network 146 to the application that it should utilize the selected data center 102 to request execution of the function. In one example, function distributor 160 sends an HTTP response over network 146 to the application to redirect the application to the selected data center 102. The HTTP response may be a code 301 or code 302 to perform URL redirection.

At block 308, the application sends a request to execute the function to the selected data center 102. In certain embodiments, the application sends the request over network 146. For example, the code in the application that calls the function may still specify the URL associated with the function distributor 160. However, based on the URL redirection by the function distributor 160, the application now associates the URL with the selected data center 102. Accordingly, the application establishes an HTTP session with selected data center 102. The application further generates an HTTP request to execute the function and sends the HTTP request to the selected data center 102.

At block 310, the selected data center 102 executes the function.

Accordingly, the function distributor 160 automatically selects a data center to execute a function such as based on proximity of the data center, instead of an application being tied to using a single data center to execute the function.

In certain aspects, the function distributor 160 may also perform a clean up function and delete functions from data centers 102. For example, if the function distributor 160 determines that it has not selected a particular data center 102 to execute a particular function for a threshold period of time (e.g., days, months, years), the function distributor 160 may delete the particular function from the particular data center 102 (e.g., using root access or APIs as discussed). In certain aspects, a developer can indicate to the function distributor 160 to delete a particular function and the function distributor 160 can delete the function from the corresponding data centers 102 that include the function.

Figure 4:
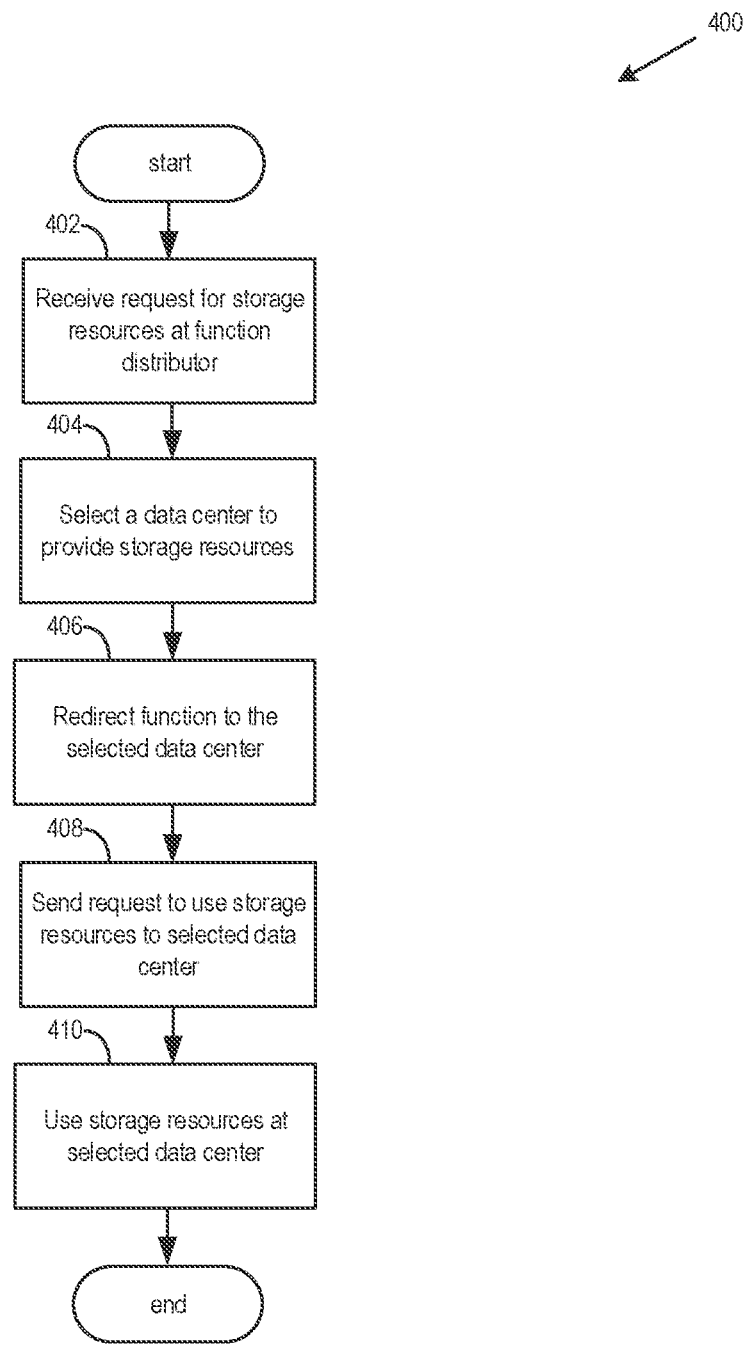
FIG. 4 depicts a flow diagram of a method of handling a request for storage resources in a cloud system at a function distributor, accordingly to an embodiment.

FIG. 4 depicts a flow diagram of a method 400 of handling a request for storage resources in a cloud system at a function distributor, accordingly to an embodiment. Method 400 is described with respect to cloud system 100 of FIG. 1.

At block 402, function distributor 160 receives a request for storage resources on cloud system 100. For example, function distributor 160 receives the request from a function executing in a data center 102 over network 146.

In one example, the function includes instructions that call for using (e.g., reading/writing) storage resources of cloud system 100. The instructions that call for using storage resources, instead of specifying a location of storage resources in a particular data center 102, include a pointer to function distributor 160 (e.g., the URL of function distributor 160) and global/generic identifiers of storage locations across data centers 102.

For example, a data center 102 may include storage resources in the form of a database that includes a plurality of buckets corresponding to storage locations. Each of the buckets is associated with an identifier unique within the data center 102, but which may not be unique across data centers 102. When a function is hardcoded to use the storage resources of a particular data center 102, the instructions that call for using the storage resources may point to the specific data center 102, and include identifiers of storage locations that are used within the data center 102 to use the specific storage locations of the storage resources. Therefore, the function is limited to using the hardcoded storage locations in the specific data center 102.

However, a function according to embodiments of the present disclosure can include a pointer to function distributor 106 and global identifiers of storage locations across data centers 102. The function distributor 106 can then redirect the function to use storage resources of a particular data center 102 and translate the global identifiers to identifiers of specific storage locations in the data center 102 as further discussed herein.

In some embodiments, the function establishes an HTTP session with function distributor 160 based on the URL of function distributor 160 being included in instructions of the function. The function further generates an HTTP request to use storage resources of cloud system 100 and sends the HTTP request to the function distributor 160.

At block 404, the function distributor 160 selects a data center 102 in cloud system 100 to use the storage resources of. For example, the function distributor 160 selects a data center 102 that provides storage resources that is closest geographically to the function, similar to as discussed with respect to block 304.

At block 406, the function distributor 160 redirects the function to the selected data center 102. In particular, the function distributor 160 sends information over network 146 to the function that it should utilize the selected data center 102 for storage resources. In one example, function distributor 160 sends an HTTP response over network 146 to the function to redirect the function to the selected data center 102. The HTTP response may be a code 301 or code 302 to perform URL redirection. The HTTP response may further include a translation of global identifiers of storage locations to identifiers of specific storage locations in the selected data center 102.

At block 408, the function sends a request to use storage resources to the selected data center 102. In certain embodiments, the function sends the request over network 146. For example, the code in the function may still specify the URL associated with the function distributor 160. However, based on the URL redirection by the function distributor 160, the function now associates the URL with the selected data center 102. Accordingly, the function establishes an HTTP session with selected data center 102. The function further generates an HTTP request to use storage resources and sends the HTTP request to the selected data center 102. In some embodiments, the function includes in the HTTP request the identifiers of specific storage locations in the selected data center 102 received from function distributor 160.

At block 410, the selected data center 102 provides storage resources to the function.

Accordingly, the function distributor 160 automatically selects a data center to provide storage resources such as based on proximity of the data center, instead of a function being tied to using a single data center for storage resources.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASICs), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of handling a request for at least one storage resource of a cloud computing system comprising a plurality of data centers, each of the plurality of data centers comprising one or more storage resources, the method comprising:
   receiving, at a function distributor from an application, a request for at least one storage resource, the request comprising one or more global identifiers of one or more storage locations across the plurality of data centers;
   selecting, by the function distributor, a data center to provide the at least one storage resource;
   translating the one or more global identifiers to one or more identifiers of one or more specific storage locations in the data center; and
   causing, by the function distributor, the application to utilize the at least one storage resource of the data center based on the one or more identifiers of the one or more specific storage locations.

2. The method of claim 1, wherein causing the application to utilize the at least one storage resource of the data center comprises:
   redirecting, by the function distributor, the application to the data center causing the application to send a second request including the one or more identifiers to the data center, the data center providing the at least one storage resource based on receiving the second request.

3. The method of claim 2, wherein the application comprises instructions that call for using the at least one storage resource, the instructions comprising a uniform resource locator (URL) associated with the function distributor and not the data center, and wherein redirecting the application comprises:
   sending, by the function distributor, an HTTP response or HTTPS response to the application to perform URL redirection of the URL to the data center.

4. The method of claim 1, wherein the request further comprises information indicative of a location of where the application is running, and wherein selecting the data center is based on a location of the data center and the location of where the application is running.

5. The method of claim 1, wherein the application comprises a function running in a second data center.

6. The method of claim 1, further comprising:
loading, by the function distributor, a function on multiple data centers of the plurality of data centers prior to receiving a second request to execute the function;
receiving, at the function distributor from the application, the second request;
selecting, by the function distributor, a second data center of the multiple data centers to execute the function based on the multiple data centers having the function loaded prior to receiving the second request; and
causing, by the function distributor, the second data center to execute the function.

7. The method of claim 6, wherein causing the second data center to execute the function comprises:
redirecting, by the function distributor, the application to the second data center causing the application to send a third request to execute the function to the second data center, the second data center executing the function based on receiving the third request.

8. A non-transitory computer readable medium comprising instructions to be executed in a computer system, wherein the instructions when executed in the computer system perform a method of handling a request for at least one storage resource of a cloud computing system comprising a plurality of data centers, each of the plurality of data centers comprising one or more storage resources, the method comprising:
receiving, at a function distributor from an application, a request for at least one storage resource, the request comprising one or more global identifiers of one or more storage locations across the plurality of data centers;
selecting, by the function distributor, a data center to provide the at least one storage resource;
translating the one or more global identifiers to one or more identifiers of one or more specific storage locations in the data center; and
causing, by the function distributor, the application to utilize the at least one storage resource of the data center based on the one or more identifiers of the one or more specific storage locations.

9. The non-transitory computer readable medium of claim 8, wherein causing the application to utilize the at least one storage resource of the data center comprises:
redirecting, by the function distributor, the application to the data center causing the application to send a second request including the one or more identifiers to the data center, the data center providing the at least one storage resource based on receiving the second request.

10. The non-transitory computer readable medium of claim 9, wherein the application comprises instructions that call for using the at least one storage resource, the instructions comprising a uniform resource locator (URL) associated with the function distributor and not the data center, and wherein redirecting the application comprises:
sending, by the function distributor, an HTTP response or HTTPS response to the application to perform URL redirection of the URL to the data center.

11. The non-transitory computer readable medium of claim 8, wherein the request further comprises information indicative of a location of where the application is running, and wherein selecting the data center is based on a location of the data center and the location of where the application is running.

12. The non-transitory computer readable medium of claim 8, wherein the application comprises a function running in a second data center.

13. The non-transitory computer readable medium of claim 8, wherein the method further comprises:
loading, by the function distributor, a function on multiple data centers of the plurality of data centers prior to receiving a second request to execute the function;
receiving, at the function distributor from the application, the second request;
selecting, by the function distributor, a second data center of the multiple data centers to execute the function based on the multiple data centers having the function loaded prior to receiving the second request; and
causing, by the function distributor, the second data center to execute the function.

14. The non-transitory computer readable medium of claim 13, wherein causing the second data center to execute the function comprises:
redirecting, by the function distributor, the application to the second data center causing the application to send a third request to execute the function to the second data center, the second data center executing the function based on receiving the third request.

15. A function distributor configured to perform a method of handling a request for at least one storage resource of a cloud computing system comprising a plurality of data centers, each of the plurality of data centers comprising one or more storage resources, the method comprising:
receiving, at the function distributor from an application, a request for at least one storage resource, the request comprising one or more global identifiers of one or more storage locations across the plurality of data centers;
selecting, by the function distributor, a data center to provide the at least one storage resource;
translating the one or more global identifiers to one or more identifiers of one or more specific storage locations in the data center; and
causing, by the function distributor, the application to utilize the at least one storage resource of the data center based on the one or more identifiers of the one or more specific storage locations.

16. The function distributor of claim 15, wherein causing the application to utilize the at least one storage resource of the data center comprises:
redirecting, by the function distributor, the application to the data center causing the application to send a second request including the one or more identifiers to the data center, the data center providing the at least one storage resource based on receiving the second request.

17. The function distributor of claim 16, wherein the application comprises instructions that call for using the at least one storage resource, the instructions comprising a uniform resource locator (URL) associated with the function distributor and not the data center, and wherein redirecting the application comprises:
sending, by the function distributor, an HTTP response or HTTPS response to the application to perform URL redirection of the URL to the data center.

18. The function distributor of claim 15, wherein the request further comprises information indicative of a location of where the application is running, and wherein selecting the data center is based on a location of the data center and the location of where the application is running.

19. The function distributor of claim 15, wherein the method further comprises:
- loading, by the function distributor, a function on multiple data centers of the plurality of data centers prior to receiving a second request to execute the function;
- receiving, at the function distributor from the application, the second request;
- selecting, by the function distributor, a second data center of the multiple data centers to execute the function based on the multiple data centers having the function loaded prior to receiving the second request; and
- causing, by the function distributor, the second data center to execute the function.

20. The function distributor of claim 19, wherein causing the second data center to execute the function comprises:
- redirecting, by the function distributor, the application to the second data center causing the application to send a third request to execute the function to the second data center, the second data center executing the function based on receiving the third request.

* * * * *